ң
United States Patent
Kouda et al.

(10) Patent No.: US 9,523,968 B2
(45) Date of Patent: Dec. 20, 2016

(54) ELECTRIC DEVICE AND ELECTRIC DEVICE CONTROL METHOD

(71) Applicant: Panasonic Corporation, Kadoma-shi, Osaka (JP)

(72) Inventors: Tetsuya Kouda, Osaka (JP); Satoshi Tsujimura, Hyogo (JP); Naofumi Nakatani, Shiga (JP); Toshihisa Ikeda, Kyoto (JP); Yasuo Yoshimura, Shiga (JP); Kazunori Kurimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 411 days.

(21) Appl. No.: 14/240,708

(22) PCT Filed: Oct. 12, 2012

(86) PCT No.: PCT/JP2012/006544
§ 371 (c)(1),
(2) Date: Feb. 24, 2014

(87) PCT Pub. No.: WO2013/061532
PCT Pub. Date: May 2, 2013

(65) Prior Publication Data
US 2014/0207256 A1    Jul. 24, 2014

(30) Foreign Application Priority Data
Oct. 27, 2011  (JP) .................. 2011-235763

(51) Int. Cl.
*G05B 13/02*  (2006.01)
*F24F 11/00*  (2006.01)
(Continued)

(52) U.S. Cl.
CPC .......... *G05B 13/02* (2013.01); *F24F 11/0009* (2013.01); *A47L 15/0047* (2013.01); *D06F 33/02* (2013.01);
(Continued)

(58) Field of Classification Search
None
See application file for complete search history.

(56) References Cited

U.S. PATENT DOCUMENTS

2009/0299504 A1 * 12/2009 Kumazawa ........ G05B 19/4183
                                                          700/83
2011/0307099 A1    12/2011 Kumata et al.

FOREIGN PATENT DOCUMENTS

EP    2 479 863 A1    7/2012
JP    2003-254581 A   9/2003
(Continued)

OTHER PUBLICATIONS

International Search Report for International Application No. PCT/JP2012/006544, dated Dec. 18, 2012, 2 pages.

*Primary Examiner* — Sean Shechtman
*Assistant Examiner* — Steven Garland
(74) *Attorney, Agent, or Firm* — Brinks Gilson & Lione (57) ABSTRACT

An electric device includes operation unit, working unit, and a number-of-times detecting unit that counts the number of times of instructions being against energy savings. In addition, the device includes time measuring unit that measures time from when the number-of-times detecting unit starts the counting, and a controller that generates a signal to induce a modification of a first energy-saving pattern. When the time is within a first predetermined period, the controller generates a signal that requires the modification of the first energy-saving pattern into a more lenient second energy-saving pattern, with the time being from when time measuring unit starts the measurement to when the number of the times counted by the number-of-times detecting unit reaches a predetermined value.

9 Claims, 6 Drawing Sheets (51) Int. Cl.
*D06F 33/02* (2006.01)
*A47L 15/00* (2006.01)

(52) U.S. Cl.
CPC . *F24F 2011/0068* (2013.01); *F24F 2011/0073* (2013.01)

(56) References Cited

FOREIGN PATENT DOCUMENTS

| JP | 2008-083506 | * | 4/2008 |
|----|----|----|----|
| JP | 2010-210209 | A | 9/2010 |
| JP | 2010-281467 | A | 12/2010 |
| JP | 2011-038718 | A | 2/2011 |
| JP | 2011-065259 | A | 3/2011 |

* cited by examiner

ELECTRIC DEVICE AND ELECTRIC DEVICE CONTROL METHOD

This application is a 371 application of PCT/JP2012/006544 having an international filing date of Oct. 12, 2012, which claims priority to JP2011-235763 filed Oct. 27, 2011, the entire contents of which are incorporated herein by reference.

TECHNICAL FIELD

The present invention relates to electric devices which provide energy savings, and to methods of the controlling electric devices.

BACKGROUND ART

Conventionally, a device management system has been proposed which is configured with a plurality of electric devices and an operation control device for controlling the plurality of the electric devices. In such the device management system, the operation control device determines an energy-saving pattern which serves as an operational rule for each of the electric devices, thereby controlling the electric devices in accordance with the energy-saving pattern. This allows energy savings that is an objective of the total system.

In such the conventional system, control content is not sent in real time from the operation control device to the electric devices, but the electric devices autonomously control themselves in accordance with energy-saving patterns that have been sent in advance. This allows a reduction in loads on the operation control device.

Suppose a case where, in such the system, the control of the electric devices in accordance with the conventional energy-saving patterns is at a level at which a user feels uncomfortable. In this case, the user will perform a violent operation being against the energy-saving patterns, for securing user's comfort. In cases of the electric device being an air conditioner, for example, the violent operation includes lowering its setting temperature in a cooling mode and raising the setting temperature in a heating mode.

As a result, the actual operation becomes considerably different from the operation in accordance with the energy-saving patterns set in advance, which makes it difficult to achieve the objective of the total system. This has been a problem.

In view of such the problem, there have been proposed an operation control device and electric devices each equipped with a computing unit to compute an amount of violation which quantitatively expresses the violent operation in a specific period of time (see Patent Literature 1, for example).

In the technology described above, it is possible to grasp the level of conformance of each of the electric devices to the energy-saving pattern, by quantifying the violent operation in the specific period of time. Based on the grasped level, the energy-saving pattern is then modified and/or deleted, thereby allowing the setting of an appropriate energy-saving pattern for the electric device, which can provide a less amount of violent operation.

For example, when a much amount of violent operation is performed in a specific period of time, the energy-saving pattern for the electric device is modified into a more lenient energy-saving pattern. In conjunction with the modification, the energy-saving patterns for other electric devices are also modified. This allows energy savings that achieves the objective of the total system.

In such the conventional technology, for the electric device, the amount of violation that quantitatively expresses the violent operation being against the energy-saving pattern is computed to modify the energy-saving pattern. Accordingly, even when the violent operation such as a setting change is frequently made due to a user's uncomfortable feeling, it is necessary to wait until the elapse of the specific period of time, before modifying the energy-saving pattern. As a result, there is a possibility that the user feels always uncomfortable during the period until the pattern is modified, resulting in a decrease in usability.

Patent Literature 1: Japanese Patent Unexamined Publication No. 2010-210209

SUMMARY OF THE INVENTION

The present invention is intended to provide an electric device in which an operational rule can be properly set with usability hard to be impaired, and a method of controlling the electric device.

The electric device includes an operation unit to which operation instructions are inputted, a working unit, and a number-of-times detecting unit. The working unit works in accordance with a first energy-saving pattern, based on the instructions inputted to the operation unit. The number-of-times detecting unit detects, from the operation instructions, an instruction being against energy savings, and then counts the number of the instructions being against energy savings. In addition, the electric device includes a time measuring unit and a controller. The time measuring unit measures time from when the number-of-times detecting unit starts the counting. The controller generates a signal which induces a modification of a first energy-saving pattern, based on both the number counted by the number-of-times detecting unit and the time measured by the time measuring unit. Moreover, the controller generates a signal which requires a modification of the first energy-saving pattern into a second energy-saving pattern that is more lenient than the first energy-saving pattern, when the time is within a first predetermined period, with the time being from when the time measuring unit starts the measurement to when the number counted by the number-of-times detecting unit reaches a predetermined value.

Moreover, a method of controlling an electric device is to control the electric device that includes an operation unit to which operation instructions are inputted, a working unit, and a number-of-times detecting unit. The working unit works in accordance with a first energy-saving pattern, based on the instructions inputted to the operation unit. The number-of-times detecting unit detects, from the operation instructions, an instruction being against energy savings, and then counts the number of the instructions being against energy savings. In addition, the electric device includes a time measuring unit and a controller. The time measuring unit measures time from when the number-of-times detecting unit starts counting. The controller generates a signal which induces a modification of a first energy-saving pattern, based on both the number counted by the number-of-times detecting unit and the time measured by the time measuring unit. The method includes a step of generating, performed by the electric device, a signal which requires a modification of the first energy-saving pattern into a second energy-saving pattern that is more lenient than the first energy-saving pattern, when the time is within a first predetermined period, with the time being from when the time measuring unit starts the measurement to when the number counted by the number-of-times detecting unit reaches a predetermined value.

According to the configuration and method described above, when the number of the violent operations of the electric device in violation of the energy-saving pattern reaches the predetermined value, the energy-saving pattern is modified into the more lenient energy-saving pattern. For this reason, there is no need for waiting the modification of the energy-saving pattern until the specific period of time elapses, which prevents a decrease in usability.

Hence, it is possible to set the optimum energy-saving pattern for the electric device, in view of usability and cost-effectiveness.

DETAILED DESCRIPTION OF THE PREFERRED EMBODIMENTS

Hereinafter, embodiments of the present invention will be described with reference to the accompanying drawings. Note, however, that these embodiments should not be construed as limitations on the scope of the present invention.

Figure 1:
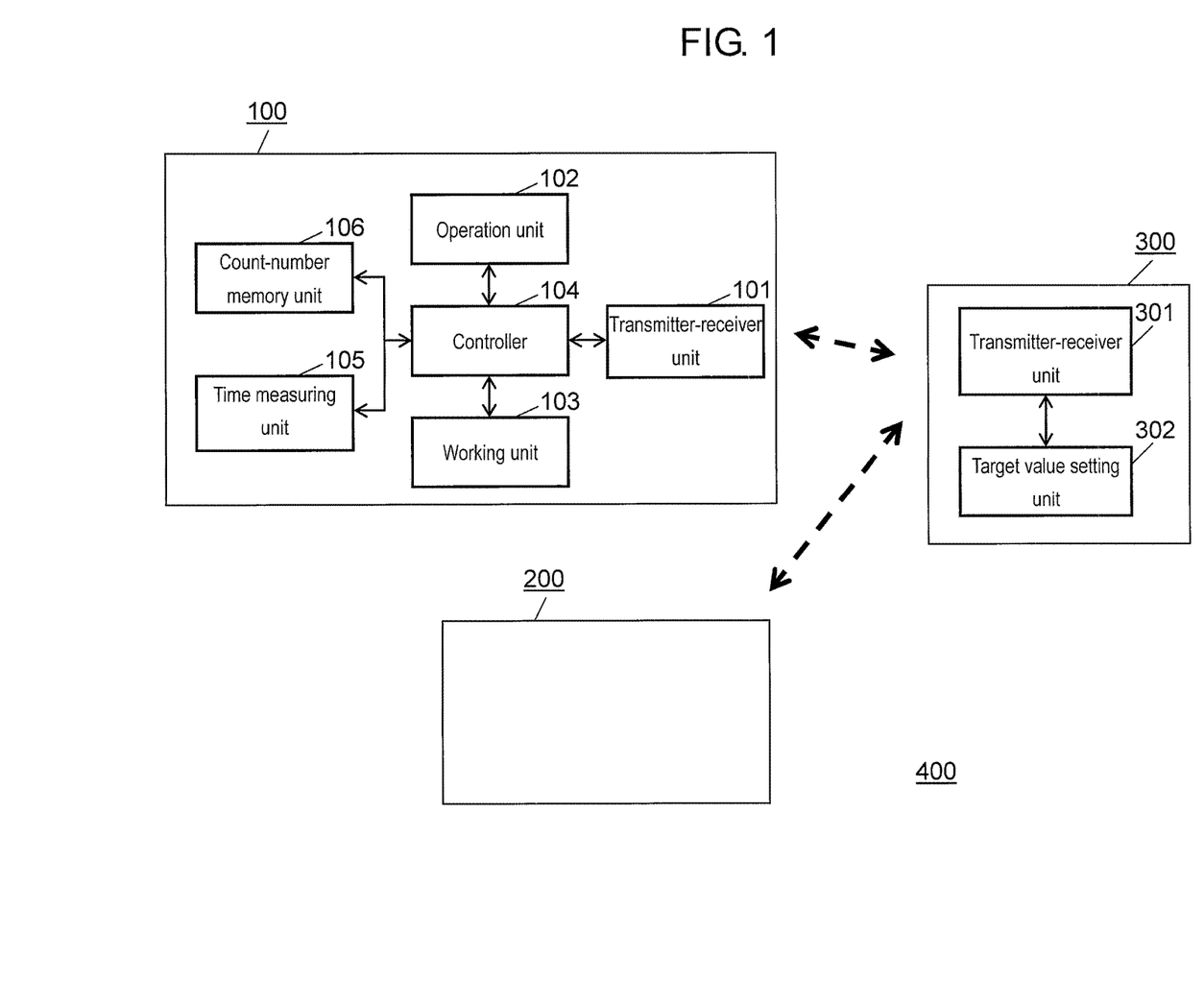
FIG. 1 is a block diagram of a configuration of a device management system according to an embodiment of the present invention.

FIG. 1 is a block diagram of a configuration of device management system 400 according to an embodiment of the invention.

Device management system 400 includes electric devices 100 and 200, and operation control device 300.

Each of electric devices 100 and 200 is coupled with operation control device 300 via a wired or wireless network, which allows information exchange between them.

Note that, although the descriptions are made here on the assumption that the number of electric devices 100 and 200 is two, the present invention is not limited to the number, so that device management system 400 may be configured with any number of electric devices 100 and 200.

Electric device 100 includes transmitter-receiver unit 101, operation unit 102, working unit 103, controller 104, time measuring unit 105, and count-number memory unit 106.

Transmitter-receiver unit 101 transmits and receives various kinds of information to and from operation control device 300, via the wired or wireless communication means.

To operation unit 102, a user's operation instruction for such as changing a setting temperature is inputted via an input means including remote control.

Working unit 103 works to perform a function of electric device 100. For example, when electric device 100 is an air conditioner, working unit 103 is a general mechanism which produces at least one of cool air and hot air. Moreover, for example, when electric device 100 is a washing machine, working unit 103 is a motor which drives a pulsator for agitating clothing. Working unit 103 works in accordance with an energy-saving pattern, based on the input to operation unit 102.

Controller 104 receives the user's instruction that is accepted by operation unit 102. Moreover, controller 104 gives a working instruction to working unit 103, based on at least one of the information received by transmitter-receiver unit 101 and the user's instruction accepted by operation unit 102. Furthermore, controller 104 generates information to be transmitted to operation control device 300 based on processing to be described later, and outputs the information to transmitter-receiver unit 301 of operation control device 300 via transmitter-receiver unit 101. In addition, controller 104 also controls count-number memory unit 106 and time measuring unit 105.

Moreover, controller 104 generates a signal which induces a modification of the energy-saving pattern, based on both the number counted by a number-of-times detecting unit to be described later and the time measured by time measuring unit 105.

Time measuring unit 105 performs time measurement based on the instruction from controller 104. Specifically, as described later, the time measurement is performed from when an energy-saving target value transmitted from operation control device 300 is received. That is, time measuring unit 105 measures the time from when the number-of-times detecting unit to be described later starts the counting.

Count-number memory unit 106 counts the number of the user's instructions being against energy savings for the operation of electric device 100, starting from when the memory unit receives the energy-saving target value transmitted from operation control device 300. Then, the count-number memory unit stores the counted number (details of this will be described later). Count-number memory unit 106 functions as a number-of-times detecting unit that detects, from the operation instructions given to operation unit 102, the instruction being against energy savings, and that counts the number of the instructions being against energy savings.

Here, the instruction being against energy savings is one, when electric device 100 is an air conditioner, for example, that includes a user's instruction which directs operation unit 102 to lower a setting temperature in a cooling mode. Conversely, in a heating mode, the instruction includes a user's instruction which directs operation unit 102 to raise the setting temperature. That is, the term "the instruction being against energy savings" as described herein means the operation instruction with which the energy consumption of the operation becomes larger than that of the operation in accordance with the energy-saving pattern.

Moreover, hereinafter in the descriptions, the term "NG-times" is used to denote the cumulative sum of the number of the instructions being against energy savings that are given by the user to the operation of electric device 100, in particular, to denote the cumulative sum of the times where NGs (the instructions being against energy savings) are recognized after time measuring unit 105 started the time measurement.

Note, however, that the configuration of electric device 200 is the same as that of electric device 100; therefore, descriptions of it will be omitted.

Then, operation control device 300 includes transmitter-receiver unit 301 and target value setting unit 302.

Transmitter-receiver unit 301 transmits and receives various kinds of information to and from at least one of electric device 100 and electric device 200 via the wired or wireless communication means.

Target value setting unit 302 allocates a total-system energy-saving target to electric devices (electric devices 100 and 200, in the case of FIG. 1) that are coupled with the control device.

Functions of target value setting unit 302 will be described specifically.

First, target value setting unit 302 determines initial allocation amount P1 of energy savings for electric device 100 and initial allocation amount P2 of energy savings for electric device 200. The determination is made using following Eqs. (1) and (2), on the assumption that the larger the average power consumption of electric device is, the larger the amount of energy savings allocatable to the device is.

$$P1 = P_{total} \times W1/(W1+W2), \qquad (1)$$

$$P2 = P_{total} \times W2/(W1+W2), \qquad (2)$$

where $P_{total}$ is the total-system energy-saving target (e.g. the amount of power consumption), W1 is the average power consumption of electric device 100, and W2 is the average power consumption of electric device 200.

Note, however, that Eqs. (1) and (2) are nothing more than an example and these equations should not be construed as limitations on the present invention. Other than this, the energy-saving target may be allocated based on a ratio of the amounts of power consumption, a ratio of the number of times of usage, or the like. In short, any method of allocation may be employed in view of user's usability, as long as it is possible to achieve the total-system energy-saving target.

Transmitter-receiver unit 301 receives an energy-saving-target reset requesting signal from electric device 100 when, for example, the NG-times in electric device 100 increases. When the energy-saving pattern for electric device 100 is modified into a more lenient energy-saving pattern, target value setting unit 302 determines allocation amount P1 (e.g. the amount of power consumption) of energy savings for electric device 100 and allocation amount P2 (e.g. the amount of power consumption) of energy savings for electric device 200, using following Eqs. (3) and (4).

$$P1 \leftarrow P1 + \Delta P, \qquad (3)$$

$$P2 \leftarrow P2 - \Delta P, \qquad (4)$$

where $\Delta P$ is the amount of change in the allocation amount of energy savings when the energy-saving pattern is modified, and the arrow "←" indicates the direction in which the value is substituted.

Note that, the modification of allocation amount P2 of energy savings for electric device 200 using Eq. (4) results in the modification of the energy-saving pattern into a severer one. This is because a higher priority is placed on the achievement of total-system energy-saving target $P_{total}$.

Therefore, for example, if the higher priority is not placed on the achievement of total-system energy-saving target $P_{total}$, the energy-saving pattern for electric device 200 may be modified into a more lenient one using Eq. (3).

On the other hand, descriptions will be made regarding the case where target value setting unit 302 modifies the energy-saving pattern for electric device 100 into a severer energy-saving pattern, upon receiving the energy-saving-target reset requesting signal from electric device 100. In this case, allocation amount P1 of energy savings for electric device 100 and allocation amount P2 of energy savings for electric device 200 are determined using following Eqs. (5) and (6).

$$P1 \leftarrow P1 - \Delta P, \qquad (5)$$

$$P2 \leftarrow P2 + \Delta P, \qquad (6)$$

Note that, the modification of allocation amount P2 of energy savings for electric device 200 using Eq. (6) results in the modification of the energy-saving pattern into a more lenient one. This is because a higher priority is placed on the achievement of total-system energy-saving target $P_{total}$.

Therefore, for example, if the higher priority is not placed on the achievement of total-system energy-saving target $P_{total}$, the energy-saving pattern for electric device 200 may be modified into a severer one using Eq. (5).

As described above, target value setting unit 302 starts by determining the allocation amounts of energy savings based on the previous average power consumptions. Then, after that, the allocation amounts of energy savings are modified in accordance with the result of the selection of the energy-saving pattern for each of electric devices 100 and 200.

This configuration allows the achievement of the total-system energy-saving target, with a user's comfortable feeling being held. Note that Eqs. (3) to (6) are nothing more than an example; therefore, other various methods of computation and correspondence may be employed.

Next, target value setting unit 302 determines the allocation amount of energy savings, and computes a setting temperature ($T_{c1}$) of electric device 100 to achieve the allocation amount. Let $T_{k1}$ (also referred to as the desired temperature, hereinafter) be the setting temperature of electric device 100 that the user desires, and let $T_{c1}$ (also referred to as the controlled temperature, hereinafter) be the setting temperature of electric device 100 in accordance with the energy-saving pattern. The relation between desired temperature $T_{k1}$ and controlled temperature $T_{c1}$ is given by following Eq. (7).

$$P1 = W1 \cdot t1 \cdot \alpha \cdot |T_{c1} - T_{k1}| \qquad (7)$$

where P1 is allocation amount P1 of energy savings for electric device 100, W1 is the average power consumption of electric device 100, t1 is the average operating time of electric device 100, and α is the rate of change of energy savings when the setting temperature is once changed.

In place of controlled temperature $T_{c1}$ calculated using Eq. (7), another quantity, e.g. power consumption, may be calculated and employed where the quantity varies depending on a time period and is capable of determining allocation amount P1 of energy savings on a time-series basis. Allocation amount P1 of energy savings for electric device 100 is determined in accordance with the energy-saving pattern.

Moreover, target value setting unit 302 determines controlled temperature $T_{c2}$ of electric device 200 as well, from P2, in the same manner.

Next, descriptions will be made regarding a flow of processes performed between electric device 100 and operation control device 300.

Figure 2:
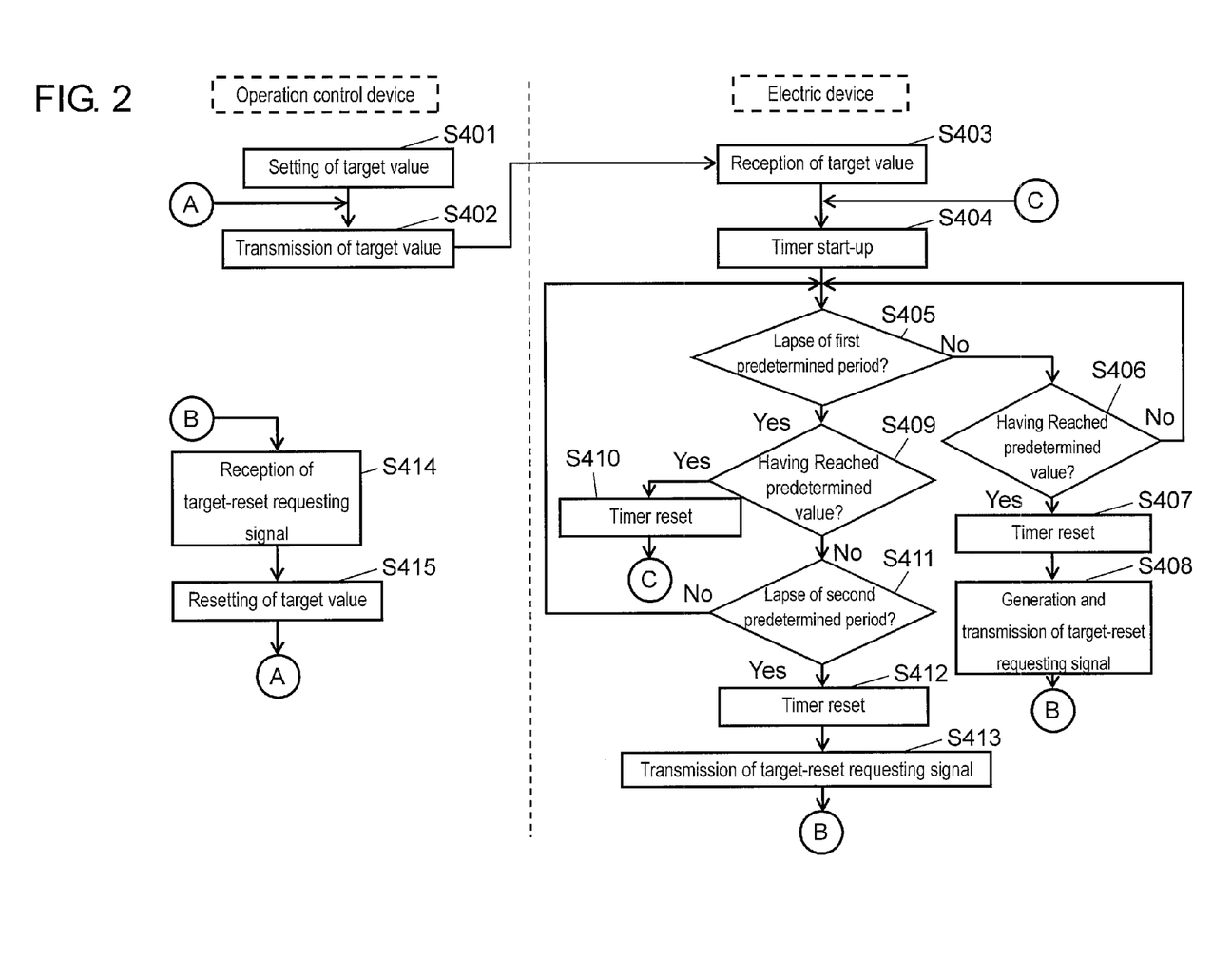
FIG. 2 is a flowchart of processes performed between an electric device and an operation control device, in accordance with the embodiment of the invention.

FIG. 2 is a flowchart of the processes performed between electric device 100 and operation control device 300, according to the embodiment of the present invention.

Note that, although operation control device 300 is also capable of controlling a plurality of other electric devices including electric device 200 as well as controlling electric device 100, FIG. 2 shows only the processes performed with electric device 100, for convenience in illustration.

First, target value setting unit 302 of operation control device 300 sets an initial energy-saving target value for electric device 100 (S401). The energy-saving target value is set as an energy-saving pattern (an amount of power consumption set on a time-series basis) or a constant amount of the power consumption. Moreover, in another example, when electric device 100 is an air conditioner, the setting temperature value obtained using Eq. (7) may be employed as the energy-saving target value.

Upon setting the initial energy-saving target value, target value setting unit 302 of operation control device 300 transmits the initial energy-saving target value (the amount of the power consumption or the setting temperature value) to electric device 100 (S402).

Electric device 100 receives the energy-saving target value transmitted from operation control device 300 (S403).

Controller 104 starts performing an autonomous operation to achieve the energy-saving target value by using working unit 103, and also starts up time measuring unit 105 to measure time (S404).

Note that electric device 100 autonomously computes and performs the operation to achieve the energy-saving target value. However, when the user inputs an instruction to operation unit 102 via remote control or the like, controller 104 is required to perform the control in accordance with the input via the remote control or the like, for a certain period of time in order to secure user's usability.

Controller 104 judges at regular intervals whether or not the time measured by time measuring unit 105 has exceeded a first predetermined period (S405).

When the judgment is that the time measured by time measuring unit 105 has not exceeded the first predetermined period (S405, No), controller 104 judges whether or not the cumulative sum of NG-times after time measuring unit 105 started the time measurement has reached a predetermined value, with the cumulative sum being stored in count-number memory unit 106 (S406).

When the judgment is that the cumulative sum of NG-times has not reached the predetermined value (S406, No), controller 104 repeats the processes of Step S405 and subsequent ones.

On the other hand, when the judgment is that the cumulative sum of NG-times has reached the predetermined value (S406, Yes), controller 104 halts and resets the measurement performed by time measuring unit 105 (S407). Then, controller 104 resets the cumulative sum of NG-times that is stored in count-number memory unit 106.

Moreover, controller 104 generates an target-reset requesting signal which requests resetting of the energy-saving target value received in Step S403 to a severer energy-saving target value, and transmits the thus-generated signal to operation control device 300 via transmitter-receiver unit 101 (S408).

In Step S405, when the judgment is that the time measured by time measuring unit 105 has exceeded the first predetermined period (S405, Yes), controller 104 judges whether or not the cumulative sum of NG-times after time measuring unit 105 started the time measurement has reached the predetermined value (S409).

Then, when the judgment is that the cumulative sum of NG-times has reached the predetermined value (S409, Yes), controller 104 halts and resets the measurement performed by time measuring unit 105 (S410). In addition, controller 104 resets the cumulative sum of NG-times that is stored in count-number memory unit 106, and repeats the processes of Step S404 and subsequent ones.

On the other hand, in Step S409, when the judgment is that the cumulative sum of NG-times has not reached the predetermined value (S409, No), controller 104 judges whether or not the time measured by time measuring unit 105 has exceeded a second predetermined period (S411). Note, however, that the second predetermined period is set to be longer in time than the first predetermined period.

In Step S411, when the judgment is that the time measured by time measuring unit 105 has not exceeded the second predetermined period (S411, No), controller 104 performs the processes of Step S405 and subsequent ones.

On the other hand, in Step S411, when the judgment is that the time measured by time measuring unit 105 has exceeded the second predetermined period (S411, Yes), controller 104 halts and resets the time measurement performed by time measuring unit 105 (S412). In addition, controller 104 resets the cumulative sum of NG-times that is stored in count-number memory unit 106. Then, controller 104 generates an target-reset requesting signal which requests resetting of the energy-saving target value received in Step S403 to a more lenient energy-saving target value, and transmitter-receiver unit 101 transmits the thus-generated signal to operation control device 300 (S413).

Transmitter-receiver unit 301 of operation control device 300 receives the energy-saving-target reset requesting signal from electric device 100 (S414). Based on the energy-saving-target reset requesting signal, target value setting unit 302 resets the energy-saving target values for electric devices 100 and 200 (S415).

Note that the energy-saving-target reset requesting signal contains both information and data. The information indicates an object device for which the energy-saving target value is to be reset. The data indicate whether the energy-saving target value is to be made more lenient or severer by the resetting.

In Step S415, target value setting unit 302 determines the energy-saving target value in such a manner that: When the energy-saving target value is to be made more lenient, the value is determined using, for example, Eqs. (3) and (4). When the energy-saving target value is to be made severer, the value is determined using, for example, Eqs. (5) and (6).

Here, descriptions will be made regarding the case where controller 104 judges that, during the first predetermined period, the cumulative sum of NG-times has reached the predetermined value (S406, Yes). In this case, the number of times of NG operations in a short period is so large that user's comfort is considered to be being greatly impaired. Accordingly, target value setting unit 302 is required to shorten the time as short as possible during which the user's comfort is impaired, by quickly modifying the energy-saving target value (the energy-saving pattern) to be a more lenient one.

Concerning such the case, descriptions will be made more specifically.

Figure 3A:
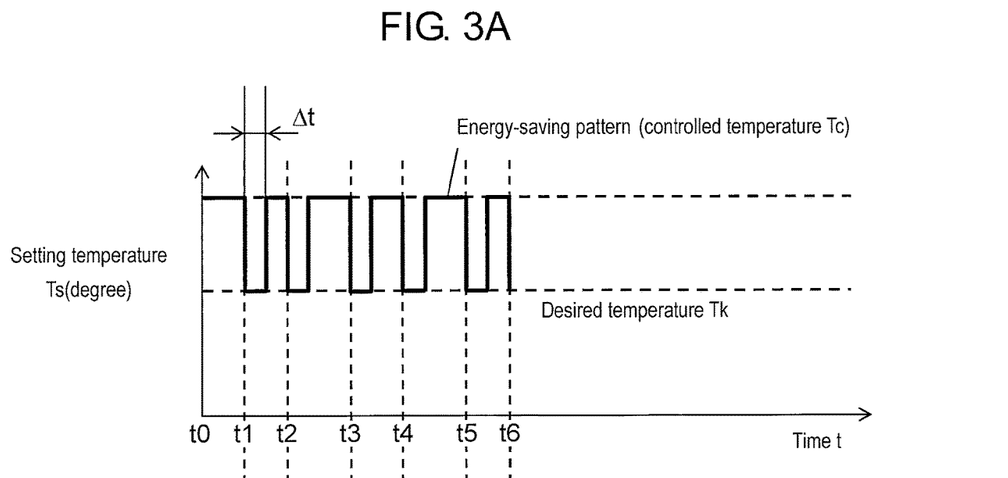
FIG. 3A is a view of an example of a setting temperature with respect to time in the device management system according to the embodiment of the invention.

FIG. 3A is a view of an example of the setting temperature with respect to time, in device management system 400 according to the embodiment of the invention. In FIG. 3A, the horizontal axis represents time "t," while the vertical axis represents setting temperature Ts of electric device 100 (an air conditioner, as an example in this case).

Figure 3B:
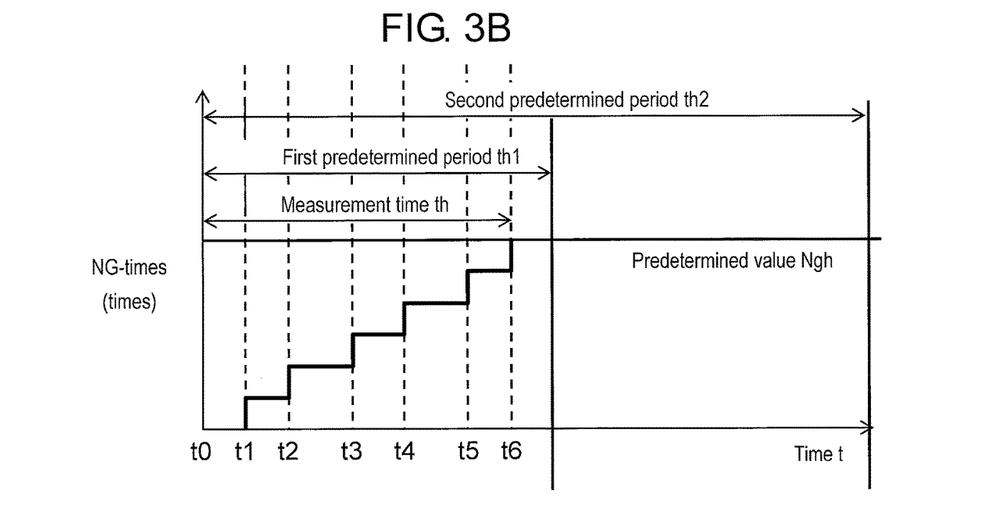
FIG. 3B is a view of an example of the number of NG-times with respect to time in the device management system according to the embodiment of the invention.

FIG. 3B is a view of an example of the NG-times with respect to time in device management system 400, according to the embodiment of the invention. In FIG. 3B, the horizontal axis represents time "t," while the vertical axis represents the NG-times.

In FIGS. 3A and 3B, there are shown controlled temperature Tc in accordance with an energy-saving pattern, first predetermined period th1, second predetermined period th2, predetermined value Ngh, and measurement time th.

In FIGS. 3A and 3B, because feeling uncomfortable during a cooling mode, the user changes setting temperature Ts of the air conditioner, from controlled temperature Tc indicated by the energy-saving pattern to lower desired temperature Tk, at times t1, t2, t,3, t4, t5, and t6. In this case, setting temperature Ts of the air conditioner, i.e. electric device 100, varies as shown in FIG. 3A. This occurs provided that the specification of electric device 100 requires that setting temperature Ts return again to controlled temperature Tc, upon the lapse of predetermined time period Δt after each of the changes from controlled temperature Tc to desired temperature Tk.

At this time, the NG-times varies as shown in FIG. 3B. That is, one more time is added to the NG-times whenever the NG operation is performed.

In FIG. 3B, controller 104 measures measurement time th at which the NG-times reaches predetermined value Ngh. Then, when controller 104 judges that measurement time th is shorter than first predetermined period th1, the controller determines that the user's comfort is being greatly impaired. Then, controller 104 generates the target-reset requesting signal that requires the modification of the currently-used energy-saving pattern (the first energy-saving pattern) into an energy-saving pattern (a second energy-saving pattern) more lenient in the amount of energy savings, and then transmits the thus-generated signal to operation control device 300 (S408). Then, without delay, target value setting unit 302 of operation control device 300 modifies the setting into a more lenient energy-saving target value (a more lenient energy-saving pattern) (S415), and transmits the result to electric device 100 (S402).

Next, descriptions will be made regarding the case where, after the lapse of first predetermined period th1, controller 104 judges that the cumulative sum of NG-times has reached the predetermined value during second predetermined period th2 (S409, Yes).

In this case, it can be determined that the NG-times have been counted in a typical operation mode, not in the special mode attributed to a user's uncomfortable feeling. Therefore, controller 104 does not generate the signal that requires the modification of the currently-used energy-saving pattern (the first energy-saving pattern). With this configuration, it is possible to prevent a decrease in cost-effectiveness and/or user's comfort, with the decrease being caused due to the modification of the energy-saving pattern accompanying a false recognition of user's comfort.

The reason for the above will be explained using an example of an air conditioner. It has been known that a typical user operates electric device 100 in such a manner that: Changes of the setting of the air conditioner, such as the setting temperature and power-ON/OFF, are made usually at a certain rate, independently of user's comfort.

Consequently, when the period in which the NG-times counted by a number-of-times detecting unit reaches the predetermined value exceeds first predetermined period th1 and remains within second predetermined period th2 longer than first predetermined period th1, controller 104 determines that the counting is performed only in a typical operation, not due to decreased user's comfort. Then, controller 104 does not modify the currently-used energy-saving pattern. With this configuration, it is possible to prevent a decrease in cost-effectiveness and/or user's comfort, with the decrease being caused due to the modification of the energy-saving pattern accompanying a false recognition of user's comfort.

Concerning such the case, descriptions will be made specifically.

Figure 4A:
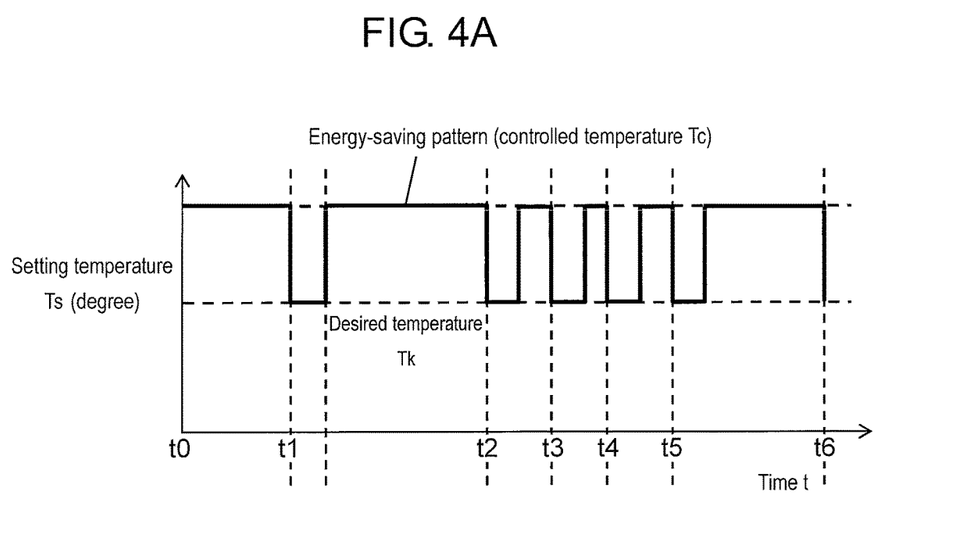
FIG. 4A is a view of another example of the setting temperature with respect to time in the device management system according to the embodiment of the invention.

FIG. 4A is a view of another example of the setting temperature with respect to time in device management system 400 according to the embodiment of the present invention. In FIG. 3A, the horizontal axis represents time "t," while the vertical axis represents setting temperature Ts of electric device 100 (an air conditioner, as an example in this case).

Figure 4B:
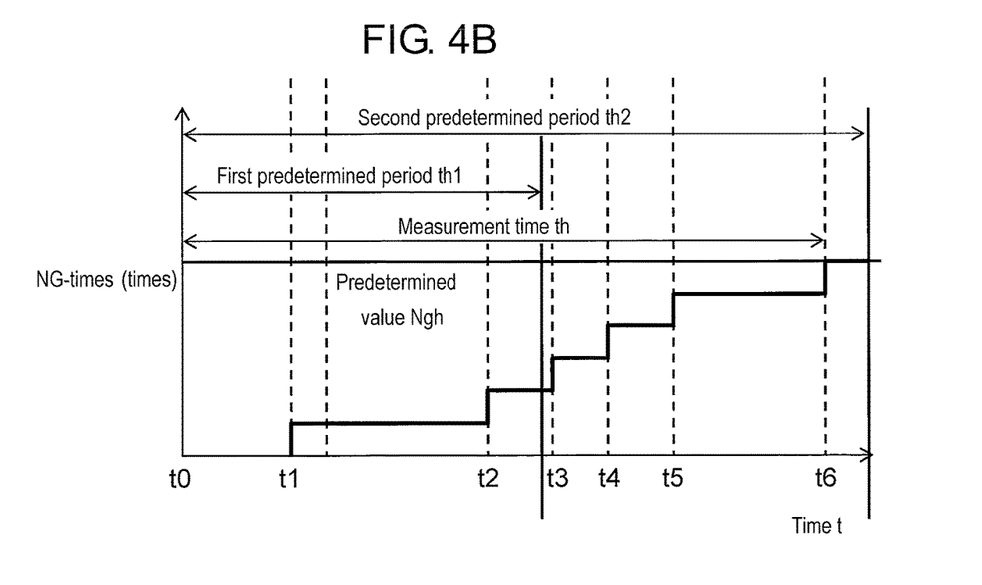
FIG. 4B is a view of another example of the number of NG-times with respect to time in the device management system according to the embodiment of the invention.

FIG. 4B is a view of another example of the NG-times with respect to time in device management system 400 according to the embodiment of the invention. In FIG. 4B, the horizontal axis represents time "t," while the vertical axis represents the NG-times.

In FIGS. 4A and 4B, there are shown controlled temperature Tc in accordance with an energy-saving pattern, first predetermined period th1, second predetermined period th2, predetermined value Ngh, and measurement time th.

In FIGS. 4A and 4B, because feeling uncomfortable during a cooling mode, the user changes setting temperature Ts of the air conditioner, from controlled temperature Tc indicated by the energy-saving pattern to lower desired temperature Tk, at times t1, t2, t,3, t4, t5, and t6. In this case, setting temperature Ts of the air conditioner, i.e. electric device 100, varies as shown in FIG. 4A. Moreover, the NG-times varies as shown in FIG. 4B.

In FIG. 4B, controller 104 measures measurement time th at which the NG-times reaches predetermined value Ngh. Then, when measurement time th is longer than first predetermined period th1 and shorter than second predetermined period th2, the controller determines that the user's comfort is not being so impaired, and continues to use the current energy-saving pattern (S410).

Next, descriptions will be made regarding the case where controller 104 judges that the cumulative sum of NG-times has yet to reach the predetermined value even after the time, from when time measuring unit 105 started the measurement, has exceeded second predetermined period th2 (S411, Yes).

In this case, judging that the user's comfort is being hardly impaired, controller 104 generates a signal that requests a modification of the currently-used energy-saving pattern (the first energy-saving pattern) into a severer energy-saving pattern (a third energy-saving pattern), which allows further energy savings.

Concerning such the case, descriptions will be made specifically.

Figure 5A:
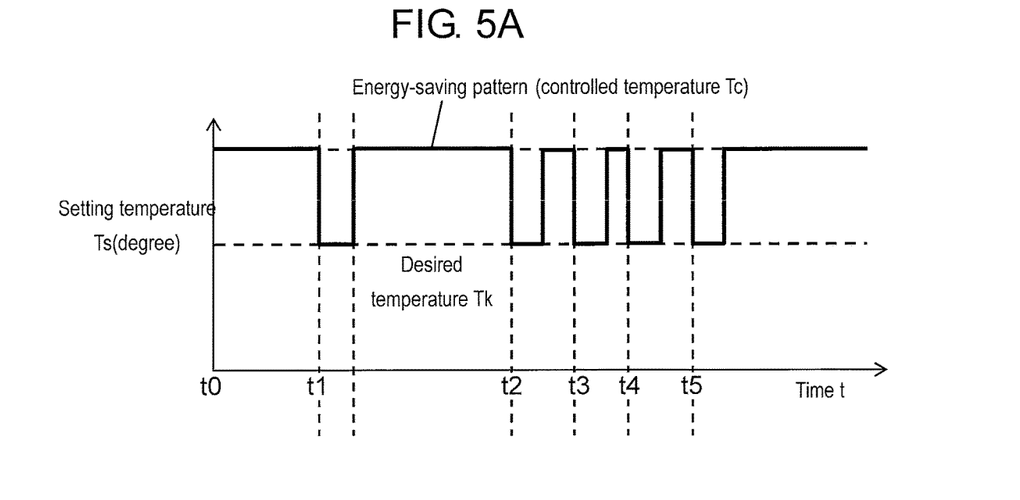
FIG. 5A is a view of further another example of the setting temperature with respect to time in the device management system according to the embodiment of the invention.

FIG. 5A is a view of further another example of the setting temperature with respect to time in device management system 400 according to the embodiment of the present invention. In FIG. 5A, the horizontal axis represents time "t," while the vertical axis represents setting temperature Ts of electric device 100 (an air conditioner, as an example in this case).

Figure 5B:
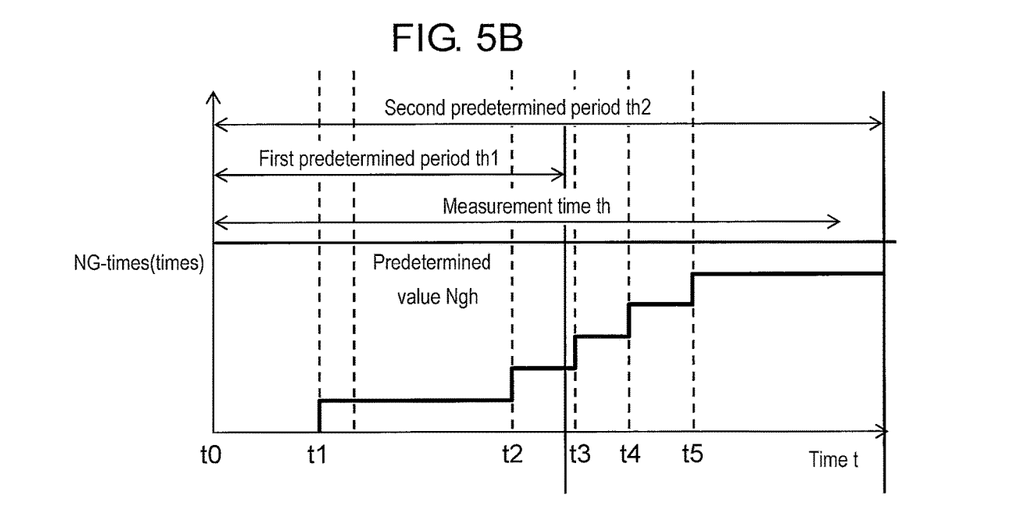
FIG. 5B is a view of further another example of the number of NG-times with respect to time in the device management system according to the embodiment of the invention.

FIG. 5B is a view of further another example of the NG-times with respect to time in device management system 400 according to the embodiment of the invention. In FIG. 5B, the horizontal axis represents time "t," while the vertical axis represents the NG-times.

In FIGS. 5A and 5B, there are shown controlled temperature Tc in accordance with an energy-saving pattern, first predetermined period th1, second predetermined period th2, predetermined value Ngh, and measurement time th.

In FIGS. 5A and 5B, because feeling uncomfortable during a cooling mode, the user changes setting temperature Ts of the air conditioner, from controlled temperature Tc indicated by the energy-saving pattern to lower desired temperature Tk, at times t1, t2, t,3, t4, and t5. In this case, setting temperature Ts of the air conditioner, i.e. electric device 100, varies as shown in FIG. 5A. Moreover, the NG-times varies as shown in FIG. 5B.

When the NG-times being against energy savings has yet to reach the predetermined value even after the lapse of second predetermined period th2 that is a relatively long period of time, this means that the control of electric device 100 using the current energy-saving pattern does not impair user's comfort. Consequently, it is possible to modify the energy-saving pattern into a severer energy-saving pattern, which allows improved cost-effectiveness.

Note, however, that first predetermined period th1 and second predetermined period th2 may be modified as needed. For example, in Step S411, suppose a case where the measurement time is judged to have exceeded second predetermined period th2 (S411, Yes). In this case, after having generated the signal that requests the modification of the energy-saving pattern into the severer energy-saving pattern, controller 104 may modify first predetermined period th1, from a preset time of e.g. 60 minutes to a time of e.g. 80 minutes.

In this way, when the energy-saving pattern is modified into the severer one, it becomes highly possible that the cause of the violent operations being against energy savings lies in a user's complaint about decreased comfort. Accordingly, when the lengthening of first predetermined period th1 causes possible user's complaint, the energy-saving pattern may be modified into a more lenient one to prevent the decrease in user's comfort.

Moreover, concurrently with the lengthening of first predetermined period th1, second predetermined period th2 may be lengthened, from a preset time of e.g. 24 hours to a time of e.g. 26 hours. Controller 104 stores, into a storage means (not shown), thus-modified first predetermined period th1 and thus-modified second predetermined period th2.

When the energy-saving pattern is modified into the severer one, it becomes less possible that the cause of the violent operations being against energy savings lies in a typical operation. Accordingly, the lengthening of second predetermined period th2 allows the prevention of the decrease in user's comfort.

As described above, by lengthening first predetermined period th1 and second predetermined period th2, it is possible to minimize the time during which user's comfort is impaired.

Conversely, in Step S406, suppose a case where controller 104 judges that the cumulative sum of NG-times after time measuring unit 105 started the time measurement has reached the predetermined value (S406, Yes). In this case, after having generated the signal that requests the modification of the energy-saving pattern into the more lenient energy-saving pattern, controller 104 may modify first predetermined period th1, from a preset time of e.g. 60 minutes to a time of e.g. 40 minutes.

When the energy-saving pattern is modified into the more lenient one, it becomes less possible that the cause of the violent operations being against energy savings lies in a user's complaint about decreased comfort. Accordingly, it is possible to improve cost-effectiveness by shortening first predetermined period th1.

Moreover, concurrently with the shortening of first predetermined period th1, second predetermined period th2 may be shortened, from a preset time of e.g. 24 hours to a time of e.g. 22 hours. Controller 104 stores, into a storage means (not shown), thus-modified first predetermined period th1 and thus-modified second predetermined period th2.

When the energy-saving pattern is modified into the lenient one, it becomes highly possible that the cause of the violent operations being against energy savings lies in a typical operation. Accordingly, it is possible to improve cost-effectiveness by shortening second predetermined period th2.

In this way, it is possible to improve cost-effectiveness by shortening first predetermined period th1 and second predetermined period th2.

Note that the energy-saving pattern is a form that represents the variation of the energy-saving target value. However, the energy-saving pattern may be, as described above, another form that is indicated by setting temperatures set on a time-series basis (the time variation of a setting temperature), or alternatively further another form that is indicated by a relation between room temperature Ta and setting temperature Ts.

When the energy-saving pattern is configured to be the time variation of a setting temperature, this allows an easy reduction of the present invention to practice. Moreover, when the energy-saving pattern is configured using the relation between the setting temperature and the room temperature, this allows a more effective prevention of a decrease in user's comfort. This is because both the setting temperature and the room temperature are closely associated with the user's comfort.

Figure 6:
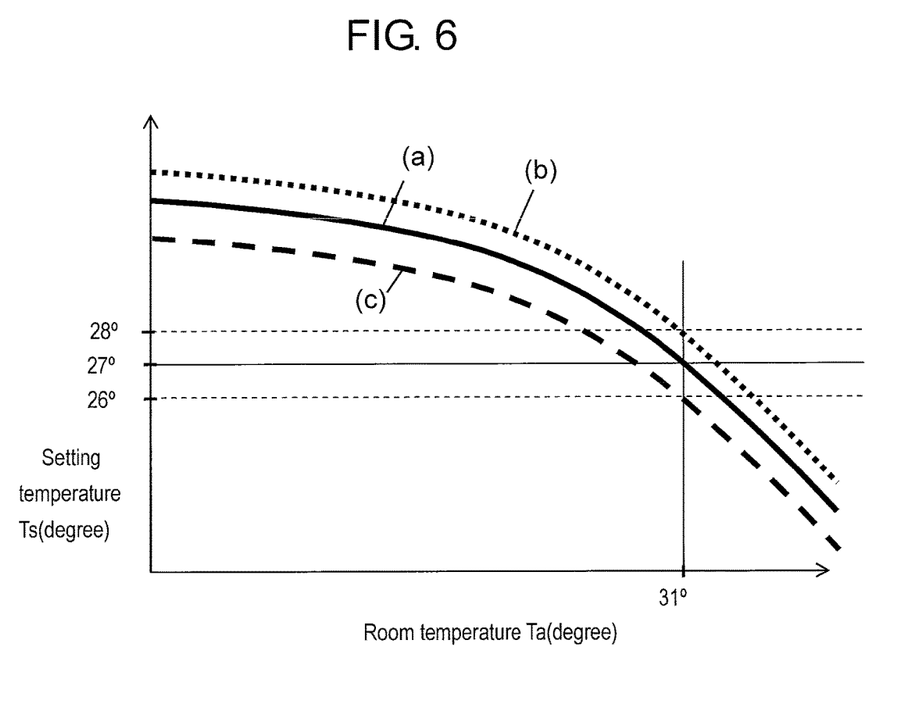
FIG. 6 is a graph illustrating an example of an energy-saving pattern in the embodiment of the invention.

FIG. 6 is a graph illustrating an example of the energy-saving pattern in the embodiment of the present invention.

With the assumption that electric device 100 is an air conditioner (in a cooling mode), FIG. 6 shows a relation between room temperature Ta of a room with the air conditioner installed therein and setting temperature Ts of the air conditioner, where room temperature Ta is represented in the horizontal axis and setting temperature Ts is represented in the vertical axis. In FIG. 6, there are shown user-set pattern (a), severer energy-saving pattern (b), and more lenient energy-saving pattern (c), all together.

As can be seen from pattern (a) set by the user, in FIG. 6, when room temperature Ta is high, setting temperature Ts of the air conditioner needs to be set lower in view of user's comfort. Conversely, when room temperature Ta is low, setting temperature Ts of the air conditioner needs to be set higher in view of cost-effectiveness.

Moreover, as shown in FIG. 6, when the air conditioner is controlled using severer energy-saving pattern (b), setting temperature Ts of the air conditioner is set to be higher than the temperature of user-set pattern (a), even at the same room temperature Ta. This results in further increased cost-effectiveness of the system on the one hand, and impaired user's comfort on the other hand.

In contrast, when the air conditioner is controlled using more lenient energy-saving pattern (c), setting temperature Ts of the air conditioner is set to be lower than the temperature of user-set pattern (a), even at the same room temperature Ta. This results in reduced cost-effectiveness of the system on the one hand, and improved user's comfort on the other hand.

In this way, of user-set pattern (a), severer energy-saving pattern (b), and more lenient energy-saving pattern (c), which one is used may be decided in consideration of user's cost-effectiveness and comfort. Specifically, severer energy-saving pattern (b) may be used when greater importance is placed on user's cost-effectiveness, while more lenient energy-saving pattern (c) may be used when greater importance is placed on user's comfort.

In this way, the relation between room temperature Ta and setting temperature Ts of the air conditioner can be used as the energy-saving pattern.

Note that, in the embodiment, the descriptions have been made using the cases where the computations of Eq. (3) through Eq. (7) are performed in the operation control device 300 side. However, the cases should not be construed as limitations on the scope of the present invention.

For example, in lieu of operation control device 300, the steps described above may be performed in either the electric device 100 side or the electric device 200 side, and then the modification of the energy-saving pattern is performed autonomously in the electric device 100 and electric device 200 sides. In this case, there is no need for both transmitting the energy-saving-target reset requesting signal shown in Steps S408 and S413, and receiving the energy-saving-target reset requesting signal shown in Step S414. Moreover, the computation shown in Step S415 may be performed by controller 104 in the electric device 100 and electric device 200 sides.

INDUSTRIAL APPLICABILITY

As described above, in accordance with the present invention, it is possible to provide exceptional advantages in that the operational rule can be appropriately set, with the usability being hard to be impaired. That is, the invention allows the optimal control that achieves the energy-saving target, with the usability being taken into consideration; therefore, it is useful for electric devices to attain energy savings, and for methods of controlling the electric devices.

The invention claimed is:

1. An electric device comprising:
an operation unit, to which an operation instruction is inputted;
a working unit for working in accordance with a first energy-saving pattern, based on the operation instruction inputted to the operation unit;
a number-of-times detecting unit for detecting, from the operation instruction, an instruction being against energy savings and for counting a number of times of the instruction being against the energy savings;
a time measuring unit for measuring time from when the number-of-times detecting unit starts counting; and
a controller for generating a signal inducing a modification of the first energy-saving pattern, based on both the number of the times counted by the number-of-times detecting unit and the time measured by the time measuring unit, wherein the controller generates the signal requesting the modification of the first energy-saving pattern into a third energy-saving pattern severer than the first energy-saving pattern when the number of the times counted by the number-of-times detecting unit does not reach the predetermined value even after the time exceeds a second predetermined period longer than the first predetermined period, the time being from when the time measuring unit starts measuring, and
wherein, when the time is within a first predetermined period, the time being from when the time measuring unit starts measuring to when the number of the times counted by the number-of-times detecting unit reaches a predetermined count value, the controller generates the signal requesting the modification of the first energy-saving pattern into a second energy-saving pattern more lenient than the first energy-saving pattern.

2. The electric device according to claim 1, wherein the controller does not generate the signal requesting the modification of the first energy-saving pattern when a period in time exceeds the first predetermined period and is within the second predetermined period, the period in time being from when time measuring unit starts measuring to when the number of the times counted by the number-of-times detecting unit reaches the predetermined value.

3. The electric device according to claim 2, wherein the controller lengthens the first predetermined period after the controller generates the signal requesting the modification of the first energy-saving pattern into the third energy-saving pattern.

4. The electric device according to claim 2, wherein the controller lengthens the second predetermined period after the controller generates the signal requesting the modification of the first energy-saving pattern into the third energy-saving pattern.

5. The electric device according to claim 1, wherein the controller shortens the first predetermined period after the controller generates the signal requesting the modification of the first energy-saving pattern into the second energy-saving pattern.

6. The electric device according to claim 1, wherein the controller shortens the second predetermined period after the controller generates the signal requesting the modification of the first energy-saving pattern into the second energy-saving pattern.

7. A method of controlling an electric device including: an operation unit, an operation instruction being inputted to the unit; a working unit for working in accordance with a first energy-saving pattern, based on the instruction inputted to the operation unit; a number-of-times detecting unit for detecting, from the operation instruction, an instruction being against energy savings and for counting a number of times of the instruction being against the energy savings; a time measuring unit for measuring time from when the number-of-times detecting unit starts the counting; and a controller for generating a signal inducing a modification of the first energy-saving pattern, based on both the number of the times counted by the number-of-times detecting unit and the time measured by the time measuring unit,
the method comprising the steps of generating, performed by the controller, a signal requesting a modification of the first energy-saving pattern into a second energy-saving pattern more lenient than the first energy-saving pattern when the time is within a first predetermined period, the time being from when time measuring unit starts measuring to when the number of the times counted by the number-of-times detecting unit reaches a predetermined count value.

8. An electric device comprising:
an operation unit, to which an operation instruction is inputted;
a working unit for working in accordance with a first energy-saving pattern, based on the operation instruction inputted to the operation unit;
a number-of-times detecting unit for detecting, from the operation instruction, an instruction being against energy savings and for counting a number of times of the instruction being against the energy savings;

a time measuring unit for measuring time from when the number-of-times detecting unit starts counting; and a controller for generating a signal inducing a modification of the first energy-saving pattern, based on both the number of the times counted by the number-of-times detecting unit and the time measured by the time measuring unit, wherein when the time is within a first predetermined period, the time being from when the time measuring unit starts measuring to until the number of the times counted by the number-of-times detecting unit reaches a predetermined count value, the controller generates the signal requesting the modification of the first energy-saving pattern into a second energy-saving pattern more lenient than the first energy-saving pattern, wherein the first energy-saving pattern and the second energy-saving pattern are indicated by a time variation of a setting temperature.

9. An electric device comprising:

an operation unit, to which an operation instruction is inputted;

a working unit for working in accordance with a first energy-saving pattern, based on the operation instruction inputted to the operation unit;

a number-of-times detecting unit for detecting, from the operation instruction, an instruction being against energy savings and for counting a number of times of the instruction being against the energy savings;

a time measuring unit for measuring time from when the number-of-times detecting unit starts counting; and a controller for generating a signal inducing a modification of the first energy-saving pattern, based on both the number of the times counted by the number-of-times detecting unit and the time measured by the time measuring unit, wherein when the time is within a first predetermined period, the time being from when the time measuring unit starts measuring to until the number of the times counted by the number-of-times detecting unit reaches a predetermined count value, the controller generates the signal requesting the modification of the first energy-saving pattern into a second energy-saving pattern more lenient than the first energy-saving pattern, wherein the first energy-saving pattern and the second energy-saving pattern are indicated by a relation between a setting temperature and a room temperature.

* * * * *